United States Patent
Tanasuca et al.

(10) Patent No.: US 8,444,395 B2
(45) Date of Patent: May 21, 2013

(54) VARIABLE DISPLACEMENT VARIABLE PRESSURE VANE PUMP SYSTEM

(75) Inventors: Cezar Tanasuca, Richmond Hill (CA); David R. Shulver, Richmond Hill (CA)

(73) Assignee: Magna Powertrain, Inc., Concord (CA)

( * ) Notice: Subject to any disclaimer, the term of this patent is extended or adjusted under 35 U.S.C. 154(b) by 1272 days.

(21) Appl. No.: 12/161,388

(22) PCT Filed: Jan. 31, 2007

(86) PCT No.: PCT/CA2007/000118
§ 371 (c)(1),
(2), (4) Date: Jul. 18, 2008

(87) PCT Pub. No.: WO2007/087704
PCT Pub. Date: Aug. 9, 2007

(65) Prior Publication Data
US 2010/0221126 A1 Sep. 2, 2010

Related U.S. Application Data

(60) Provisional application No. 60/763,720, filed on Jan. 31, 2006.

(51) Int. Cl.
*F04B 49/00* (2006.01)
(52) U.S. Cl.
USPC .......................................................... 417/220
(58) Field of Classification Search
USPC .................. 417/220, 221, 222.1, 228; 418/26
See application file for complete search history.

(56) References Cited

U.S. PATENT DOCUMENTS

| | | | |
|---|---|---|---|
| 4,072,443 A | 2/1978 | Heath | |
| 4,510,962 A * | 4/1985 | Mott et al. | 137/102 |
| 4,558,998 A * | 12/1985 | Kiyoshige et al. | 418/26 |
| 4,634,349 A * | 1/1987 | Abe et al. | 417/219 |
| 4,711,619 A * | 12/1987 | Sundberg et al. | 418/27 |
| 5,518,380 A | 5/1996 | Fuji et al. | |
| 5,538,400 A | 7/1996 | Konishi et al. | |
| 5,690,479 A * | 11/1997 | Lehmann et al. | 418/26 |
| 5,876,185 A | 3/1999 | Schimpf et al. | |
| 6,457,946 B2 * | 10/2002 | Gretzschel et al. | 417/220 |
| 6,619,928 B2 | 9/2003 | Konishi | |
| 6,790,013 B2 * | 9/2004 | Hunter et al. | 417/220 |
| 6,913,446 B2 | 7/2005 | Nissen et al. | |

(Continued)

FOREIGN PATENT DOCUMENTS

JP 2002147374 A * 5/2002

OTHER PUBLICATIONS

JP2002147374A,May 2002,Otaki et al. machine translation.*

*Primary Examiner* — Devon Kramer
*Assistant Examiner* — Amene Bayou
(74) *Attorney, Agent, or Firm* — Harness, Dickey & Pierce, P.L.C.

(57) ABSTRACT

A variable displacement variable pressure vane pump system provides lubrication oil to a mechanical system. The pump system includes a first control mechanism to apply a force to a control slider to counter a biasing force of a biasing spring and urge the control slider away from a position corresponding to a maximum displacement position of the pump. A second control mechanism applies a force to the control slider to alter the displacement of the pump. A control varies the supply of lubrication oil to the second control mechanism to alter the output of the pump to closely correspond to the lubrication requirements of the mechanical system.

14 Claims, 12 Drawing Sheets

U.S. PATENT DOCUMENTS

| | | |
|---|---|---|
| 6,976,830 B2 | 12/2005 | Uchino |
| 7,128,542 B2 * | 10/2006 | Suzuki et al. .................. 418/26 |
| 2001/0033797 A1 | 10/2001 | Gretzschel et al. |
| 2003/0059313 A1 | 3/2003 | Hanggl |
| 2004/0156727 A1 | 8/2004 | Uchino |
| 2005/0232785 A1 | 10/2005 | Scholl |
| 2006/0034721 A1 | 2/2006 | Uchino |
| 2006/0104823 A1 * | 5/2006 | Hunter et al. ................ 417/44.2 |

* cited by examiner

VARIABLE DISPLACEMENT VARIABLE PRESSURE VANE PUMP SYSTEM

FIELD OF THE INVENTION

The present invention relates to variable displacement vane pumps. More specifically, the present invention relates to a variable displacement variable pressure vane pump system for mechanical systems such as internal combustion engines or automatic transmissions.

BACKGROUND OF THE INVENTION

Mechanical systems such as internal combustion engines and automatic transmissions typically include a lubrication pump to provide lubricating oil, under pressure, to many of the moving components and/or subsystems of the mechanical systems. In most cases, the lubrication pump is driven by a mechanical linkage to the mechanical system and thus the operating speed, and output, of the pump varies with the operating speed of the mechanical system. While the lubrication requirements of the mechanical system also vary with the operating speed of the mechanical system, unfortunately the variation in the output of the pump and the variation of the lubrication requirements of the mechanical system are generally nonlinear. The difference in these requirements is further exacerbated when temperature related variations in the viscosity and other characteristics of the lubricating oil are factored in.

To deal with these differences, prior art fixed displacement lubricating pumps were generally designed to operate effectively at high, or maximum, oil temperatures, resulting in an oversupply of lubricating oil at most mechanical system operating conditions and a waste, or pressure relief, valve was provided to "waste" the surplus lubricating oil back into the pump inlet or oil sump to avoid over pressure conditions in the mechanical system. In some operating conditions such as low oil temperatures, the overproduction of pressurized lubricating oil can be 500% of the mechanical system's needs so, while such systems work reasonably well, they do result in a significant energy loss as energy is used to pressurize the unneeded lubricating oil which is "wasted" through the relief valve.

More recently, variable displacement vane pumps have been employed as lubrication oil pumps. Such pumps generally include a control ring, or other mechanism, which can be moved to alter the displacement of the pump and thus its output at an operating speed. Typically, a feedback mechanism, in the form of a piston or control chamber supplied with pressurized lubricating oil from the output of the pump, either directly or via an oil gallery in the mechanical system, alters the displacement of the pump to avoid over pressure situations in the engine over the expected range of operating conditions of the mechanical system. An example of such a pump is shown in U.S. Pat. No. 4,342,545 to Schuster.

While such variable displacement pumps provide some improvements in energy efficiency over fixed displacement pumps, they still result in a significant energy loss as they must still be designed to provide oil pressures which meet the highest expected mechanical system requirements and operating temperatures, even when the mechanical system operating conditions normally do not necessitate such high requirements.

SUMMARY OF THE INVENTION

It is an object of the present invention to provide a novel variable displacement variable pressure vane pump which obviates or mitigates at least one disadvantage of the prior art.

According to a first aspect of the present invention, there is provided a variable displacement variable pressure vane pump system for providing lubrication oil to a mechanical system comprises: a variable displacement variable pressure vane pump having a control slider which is moveable to alter the displacement of the pump; a biasing means to bias the control slider towards a position corresponding to the maximum displacement position of the pump; a first control mechanism responsive to the pressure of the lubrication oil output from the pump to apply a force to the control slider to counter the biasing force of the biasing means and to urge the control slider away from the position corresponding to the maximum displacement position of the pump; a second control mechanism responsive to the pressure of the lubrication oil output from the pump to apply a force to the control slider to counter the biasing force of the biasing means and to urge the control slider away from the position corresponding to the maximum displacement position of the pump; and a control means operable to vary the lubrication oil supplied to the second control mechanism to alter the output of the pump to more closely correspond to the lubrication requirements of the mechanical system.

The present invention provides a variable displacement variable pressure vane pump system for providing lubrication oil to mechanical systems such as internal combustion engines and/or automatic transmissions. The system includes at least a first control mechanism, which can be a control chamber directly acting on the control slider or a control chamber and control cylinder which acts on the control slider and a second control mechanism which is a control chamber and control cylinder which acts on the control slider. A control valve, operated by an engine control unit or other suitable control mechanism, can selectively vary pressurized lubrication oil to the second control mechanism to allow the output of the pump system to more closely match the requirements of the mechanical system. In one embodiment, the control mechanism merely applies or removes pressurized lubrication oil and in another embodiment, the control mechanism can control the pressure of the pressurized lubrication oil provided to the second control mechanism. In another embodiment a third control mechanism, which is a control chamber and control cylinder which acts on the control slider, is provided to provide finer granularity in controlling the output of the pump system to more closely correspond to the lubrication requirements of the engine. In yet another embodiment, both the first and second control mechanisms are control chambers and control cylinders which act on the control slider.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
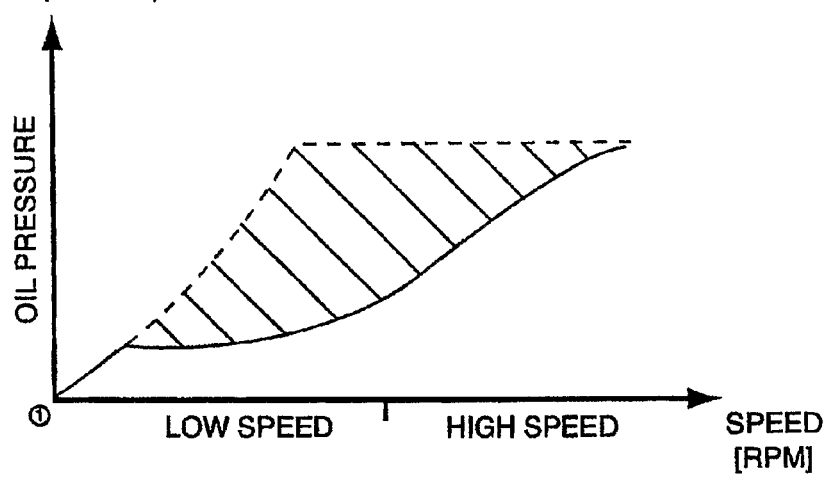
FIG. 1 shows an example of a plot of the oil pressure demand of a mechanical system versus the output of a prior art lubricating pump.

FIG. 1 shows a typical plot of the lubricating oil pressure requirement (shown in solid line) of a mechanical system, such as a typical internal combustion engine, versus the output (shown in dashed line) of a prior art variable displacement pump, such as the pump taught in the above-mentioned Schuster patent. The corner on the output (dashed line) results from the movement of the control slide by the control piston to reduce the displacement of the pump as the output of the pump reaches a preset value. The shaded area between the engine demand curve and the pump output curve represents the engine operating conditions wherein energy is lost as the pump pressure output exceeds engine demand.

Figure 2:
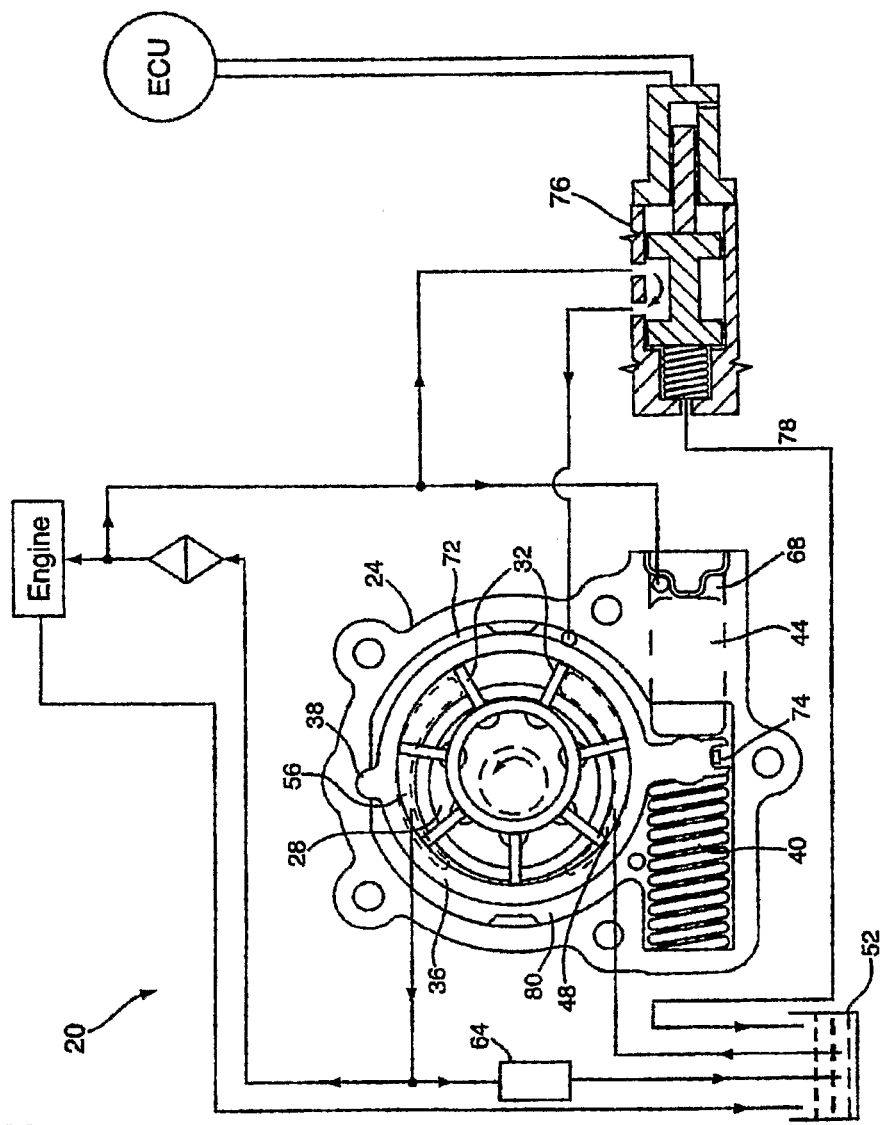
FIG. 2 shows a hydraulic circuit of a variable displacement variable pressure vane pump system in accordance with the present invention with the pump system in a lower speed, higher displacement and low pressure state.

A lubrication pump system in accordance with the present invention is indicated generally at 20 in FIG. 2. While in the following discussion the lubrication needs of an internal combustion engine are discussed, the present invention is not so limited and the present invention can be advantageously employed with a variety of mechanical systems including internal combustion engines, automatic transmission systems, etc.

System 20 includes a Variable Displacement Vane Pump (VDVP) 24, which can be any suitable VDVP, such as one similar to that taught in the above-mentioned U.S. patent to Schuster. VDVP 24 includes a rotor 28, which is driven by the internal combustion engine on which pump system 20 is installed. Rotor 28 includes a set of radially extending vanes 32 which engage the inner surface of a control slider 36 which can be moved about a pivot point 38 to alter the eccentricity between the rotor and vanes and the inner surface of control slider 36, thus altering the displacement of VDVP 24.

VDVP includes a biasing spring 40 which biases control slider 36 to the maximum displacement position and a control piston 44 is provided to, under certain conditions, move control slider 36, against the bias of biasing spring 40, towards the minimum displacement position.

VDVP 24 includes an inlet 48 which is in fluid communication with a source 52 of lubricating oil, such as the sump of an engine and an outlet 56 which supplies pressurized lubricating oil to the engine, normally through an oil filter 60. In the case of clean oil actuation, where the oil has passed through filter 60, pump outlet 56 is connected to an overpressure relief valve 64 which opens to return some lubricating oil to source 52 if the output pressure of VDVP 24 exceeds a pre-selected pressure in order to protect oil filter 60. If the actuation is performed with unfiltered oil, directly from pump outlet 56, the circuit feedback is direct, as described below with respect to the embodiment of FIG. 7, allowing the omission of overpressure relief valve 64.

As shown, chamber 68 at one end of control piston 44 is in fluid communication with the pressurized lubricating oil supplied to the engine and the force developed on control piston 44 in chamber 68, which increases with the pressure of the lubricating oil, moves control slide 36 against biasing spring 40 to reduce the displacement of VDVP 24 and hence reduce the output flow.

As will be apparent to those of skill in the art, the components of system 20 described so far, and in particular biasing spring 40 and control piston 44, are conventional and would result in VDVP 24 operating in much the same manner as illustrated in the plot of FIG. 1.

However, unlike conventional lubricating pumps (like the pump taught in Schuster) and conventional pump systems, VDVP 24 further includes a control chamber 72 formed between the interior wall of the pump housing of VDVP 24, pivot point 38, slider seal 74 and the outer surface of control slider 36 on the same side of pivot point 38 as control piston 44. Control chamber 72 is in fluid communication with a control valve 76 which is, in turn, in fluid communication with a source of pressurized lubricating oil from an engine gallery, oil line or any other suitable source of pressurized lubricating oil supplied from VDVP 24 and which has a return line 78 to source 52 to relieve pressure in control chamber 72 when control valve 76 is in the appropriate position.

Volume 80, formed between the interior wall of the housing of VDVP 24, pivot point 38, slider seal 74 and the outer surface of control slider 36 on the same side of pivot point 38 as biasing spring 40, is substantially sealed from the pressurized lubricating oil and is in fluid communication with source 52 and is thus maintained at, or close to, atmospheric pressure.

As should now be apparent to those of skill in the art, when control chamber 72 is supplied with pressurized lubricating oil, a force is developed by this lubricating oil on control slider 36. The force developed by chamber 72 adds to the force developed by control piston 44 and the resulting sum of these forces acts against the biasing force of biasing spring 40, moving control slider 36 to reduce the displacement of VDVP 24 to a greater extent than would be the case if just the force of control piston 44 was applied.

Preferably, the projected area of control chamber 72 (i.e.— the area of control chamber 72 over which the pressure of the lubrication oil generates a force on control slider 36) is much larger than the projected area of control piston 44. Thus, at lower operating speeds, control chamber 72 will generate larger forces on control slider 36, to counter the biasing force of biasing spring 40, than the forces that are developed by control piston 44. This arrangement allows a reduced size of VDVP 24, biasing spring 40 and control piston 44 thus reducing the weight and cost of VDVP 24.

Control valve 76 can selectively apply or remove pressurized fluid in response to any suitable control mechanism. In the illustrated embodiment, control valve 76 is controlled via a solenoid which is electrically actuated by a signal from the engine controller unit (ECU) which knows the engine operating speed and, in many cases, will also know at least some measure of the load on or temperature of the engine, and will actuate control valve 76 to decrease or increase the displacement of VDVP 24 as necessary to provide the designed oil pressure at different engine operating conditions.

System 20 is not limited to control valve 76 being controlled by the ECU, nor to control valve 76 being electrically controllable, although both of these are presently preferred, and control valve 76 can be operated by any suitable means as will occur to those of skill in the art.

As should now be apparent, in FIG. 2 system 20 is illustrated in a lower speed range, maximum displacement configuration wherein the force developed, due to oil pressure output from VDVP 24, in chamber 68 and in control chamber 72 act to move control slider 36 from the maximum displacement position and, due to the operating speed of VDVP 24, this force is insufficient to counter the biasing force of biasing spring 40.

Figure 3:
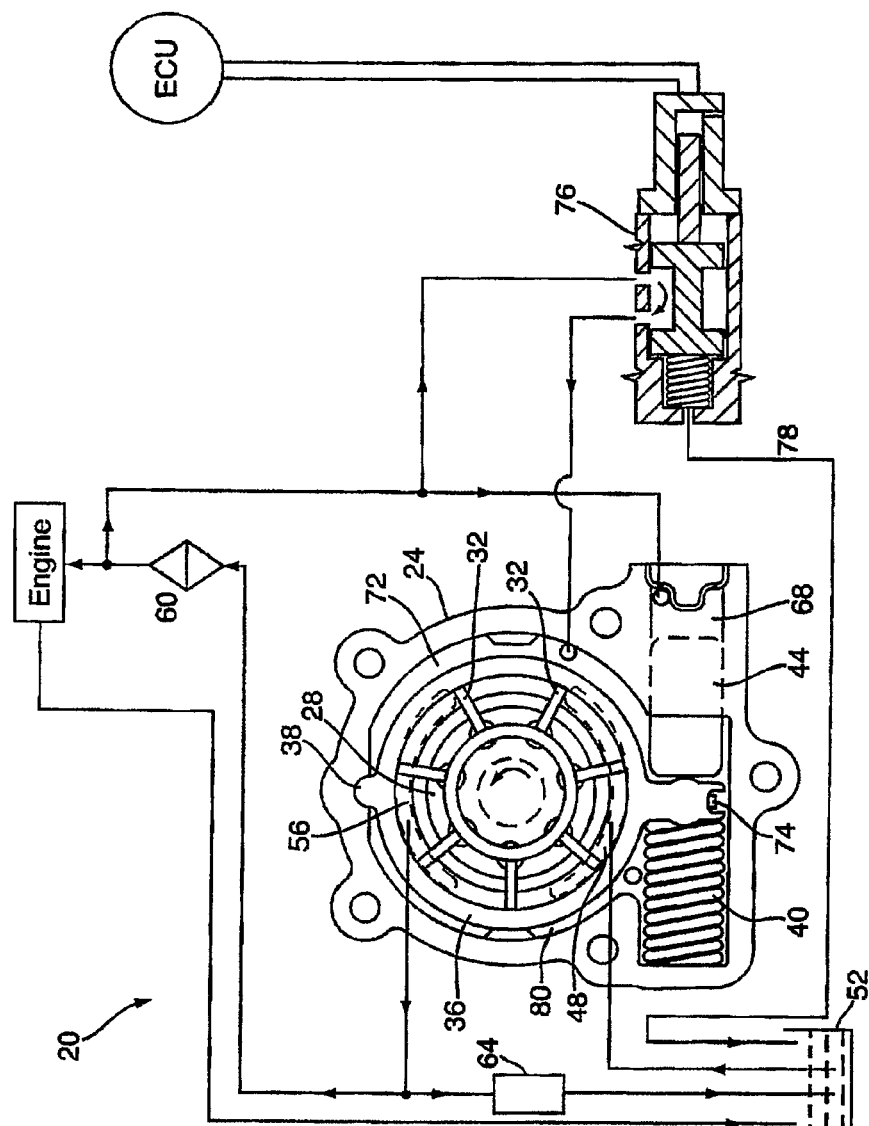
FIG. 3 shows the pump system of FIG. 2 in a lower speed, low displacement and low pressure state.

FIG. 3 shows system 20 in a low speed range, minimum displacement configuration. As illustrated, despite the relatively low speed (but higher speed than that of the configuration of FIG. 2) at which VDVP 24 is operating, control slider 36 has been moved against the biasing force of biasing spring 40 by the combined forces generated in chambers 68 and chamber 72.

Figure 4:
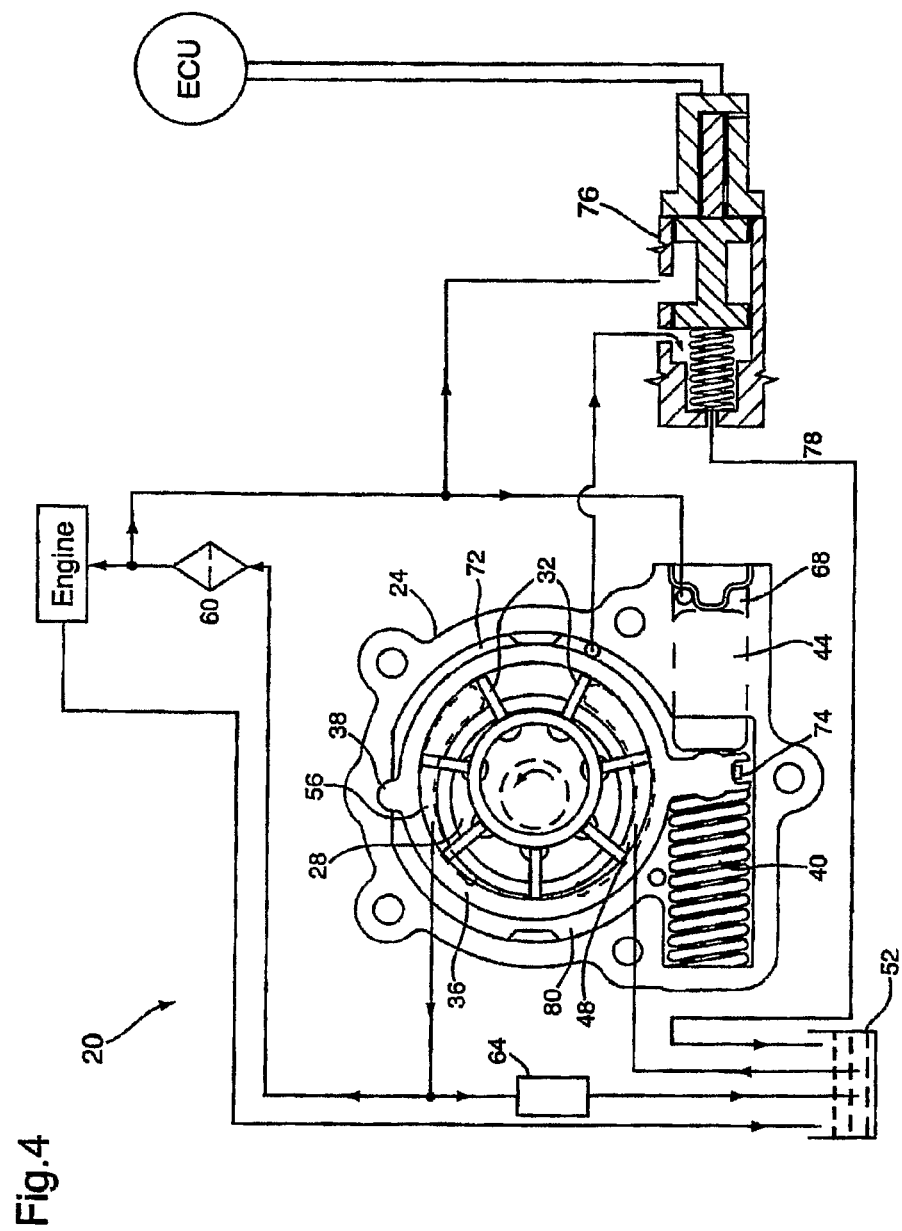
FIG. 4 shows the pump system of FIG. 2 in a higher speed, high displacement and high pressure state.

FIG. 4 shows system 20 in a high speed range, maximum displacement configuration. As illustrated, control valve 76 has been moved to disconnect the pressurized lubricating oil from control chamber 72 and to allow the pressure of the lubricating oil in control chamber 72 to return to source 52 through return line 78. Thus, control piston 44 exerts the only substantial force on control slider 36 to counter the biasing force of biasing spring 40 and this force is insufficient to counter the biasing force of biasing spring 40.

Figure 5:
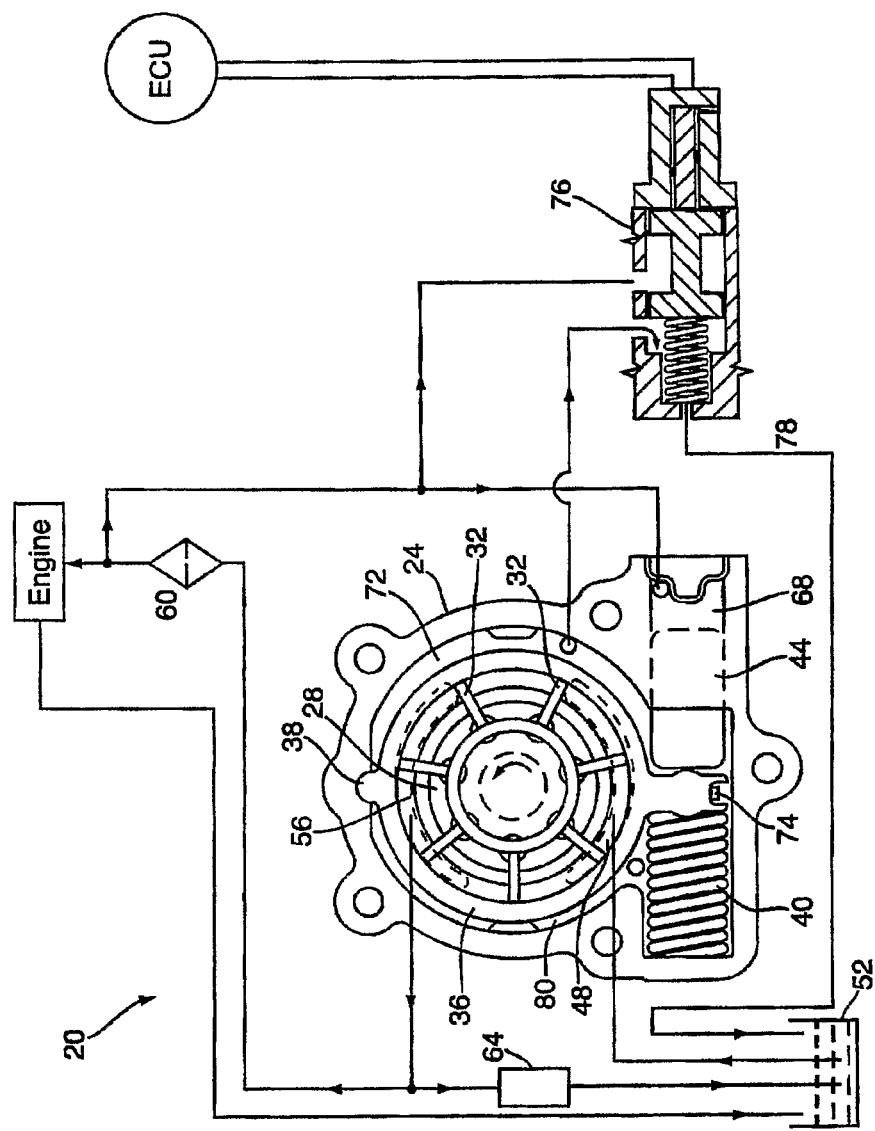
FIG. 5 shows the pump system of FIG. 2 in a higher speed, low displacement and high pressure state.

FIG. 5 shows system 20 in a high speed, minimum displacement configuration wherein control valve 76 is in the same position as in FIG. 4, removing the pressure from control chamber 72. However, due to the relatively high operating speed of VDVP 24, the pressure of the lubricating oil in chamber 68 develops sufficient force on control piston 44 to move control slider 36 to the illustrated minimum displacement position against the biasing force of biasing spring 40.

Figure 6:
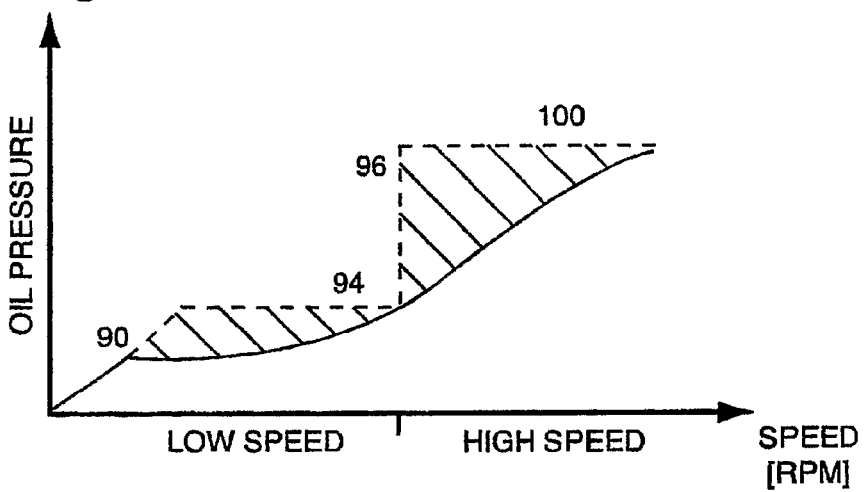
FIG. 6 shows an example plot of oil pressure demand of a mechanical system versus the output of the pump system of FIGS. 2 through 5.

FIG. 6 shows a plot, similar to that of FIG. 1, of the lubricating oil pressure requirement (shown in solid line) of a typical internal combustion engine versus the output (shown in dashed line) of an embodiment of system 20. System 20 is in the: low speed, maximum displacement configuration of FIG. 2 in the region of the plot indicated by reference numeral 90; low speed, reduced displacement configuration similar to that of FIG. 3 in the region of the plot indicated by reference numeral 94; high speed, higher displacement configuration similar to that of FIG. 4 in the region of the plot indicated by reference numeral 96; and high speed, reduced displacement configuration similar to that of FIG. 5 in the region of the plot indicated by reference numeral 100.

As is apparent, the shaded area between the engine demand curve and the output curve of system 20, wherein energy is lost as the output of system 20 exceeds engine demand, is much smaller than the comparable region of FIG. 1.

Figure 7:
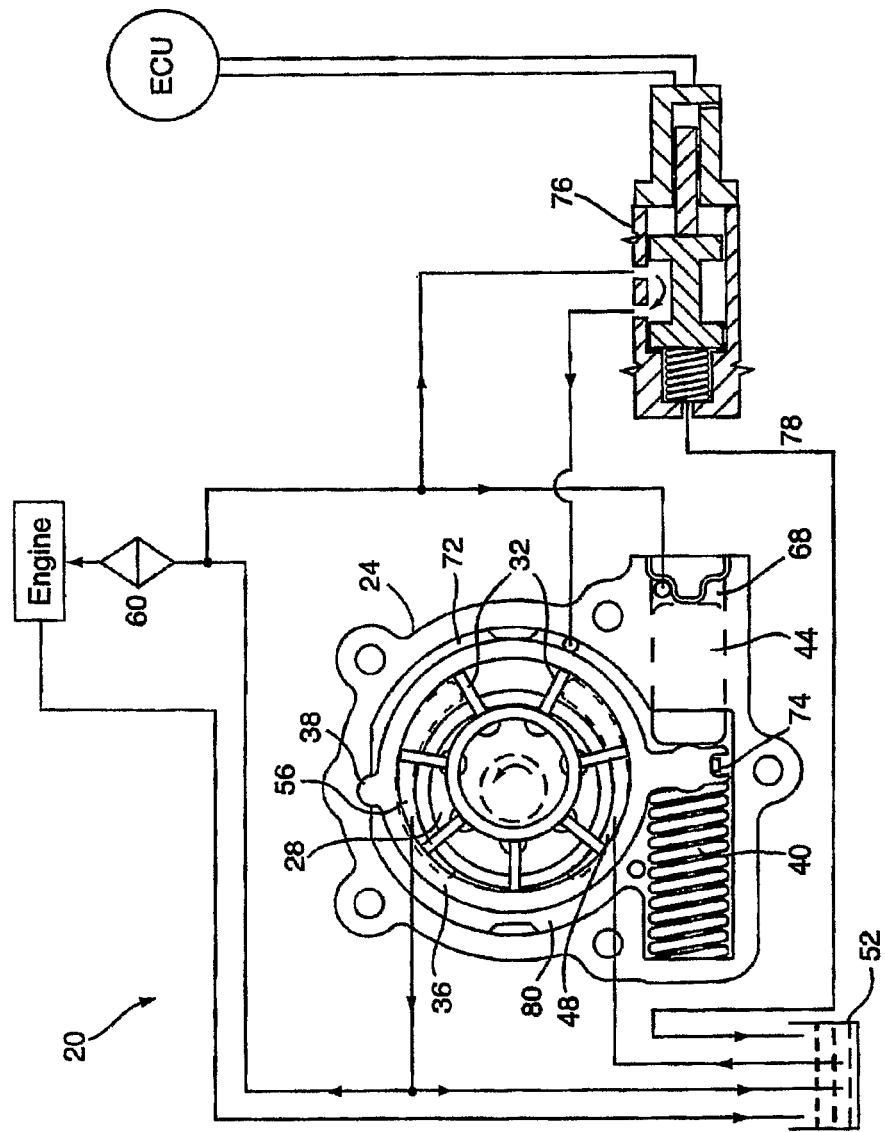
FIG. 7 shows a hydraulic circuit of another variable displacement variable pressure vane pump system in accordance with the present invention wherein the output of the pump is directly fed to the control devices.

While in the embodiments of system 20 illustrated above control chamber 72 and chamber 68 are supplied with pressurized "clean" lubrication oil downstream of oil filter 60, it will be apparent to those of skill in the art that the present invention is not so limited and either or both of control chamber 72 and chamber 68 can be supplied with pressurized lubricating oil from a point prior to oil filter 60, as illustrated in FIG. 7 wherein like components to those of FIGS. 2 through 5 are indicated with like reference numerals.

Figure 8:
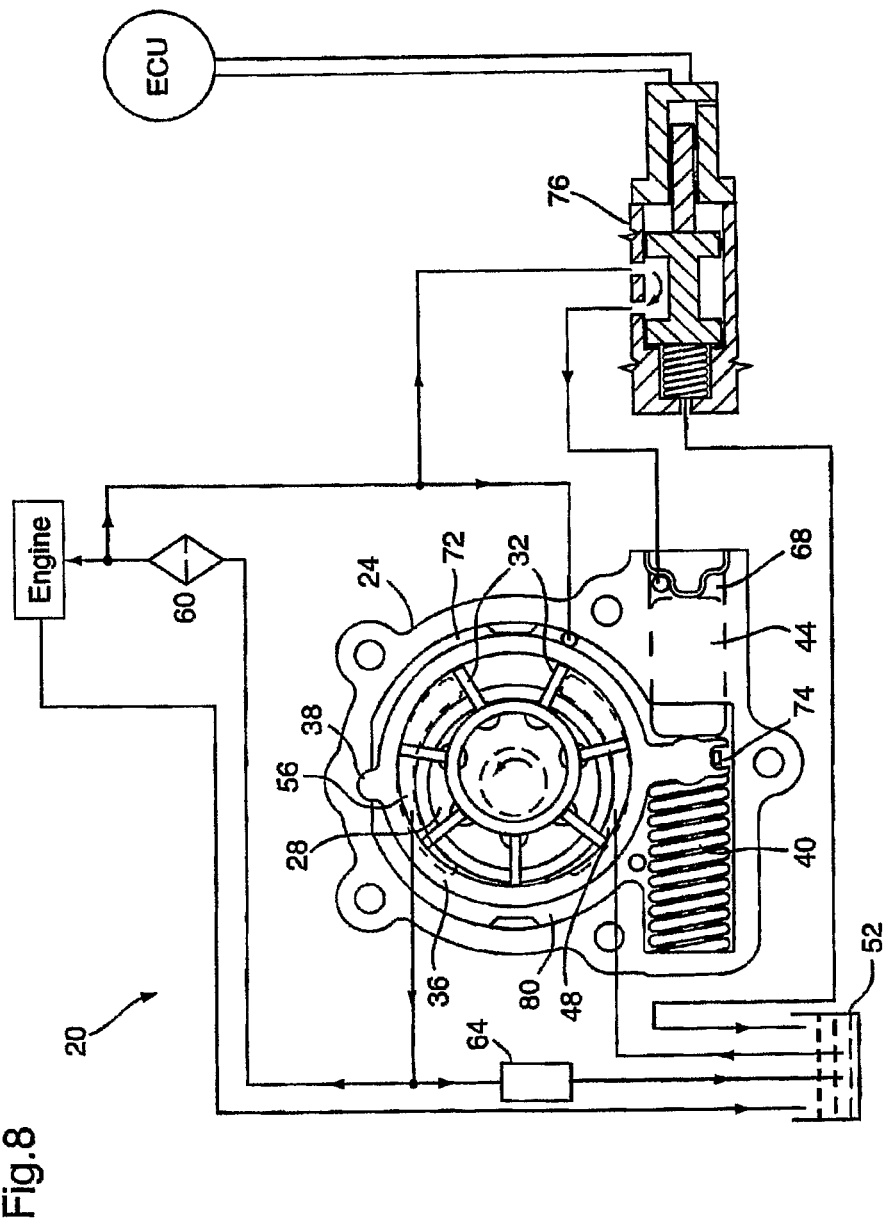
FIG. 8 shows another hydraulic circuit for the pump system of FIGS. 2 through 5.

As illustrated in FIG. 8, wherein like components to those of FIGS. 2 through 5 are indicated with like reference numerals, the present invention is not limited to control valve 76 being in fluid communication with control chamber 72 and chamber 68 being in fluid communication with a supply of pressurized lubricating oil. Instead, as illustrated in FIG. 8, control valve 76 can be used to control the supply of pressurized lubricating oil to chamber 68 while control chamber 72 is directly connected to a supply of pressurized lubricating oil.

It is further contemplated that, for any of the configurations of FIGS. 2 through 5 and FIG. 7 or 8 control valve 76 can be a variable orifice valve which can control the pressure of the lubrication oil supplied to control chamber 72, rather than just connect chamber 72 to the lubrication oil pressurized by VDVP 24 or return line 78. In this manner, a pump output characteristic can be obtained, under proper control by the ECU or other suitable control means, which very closely corresponds to the requirements of the engine rather than just two distinct pressure settings.

Figure 9:
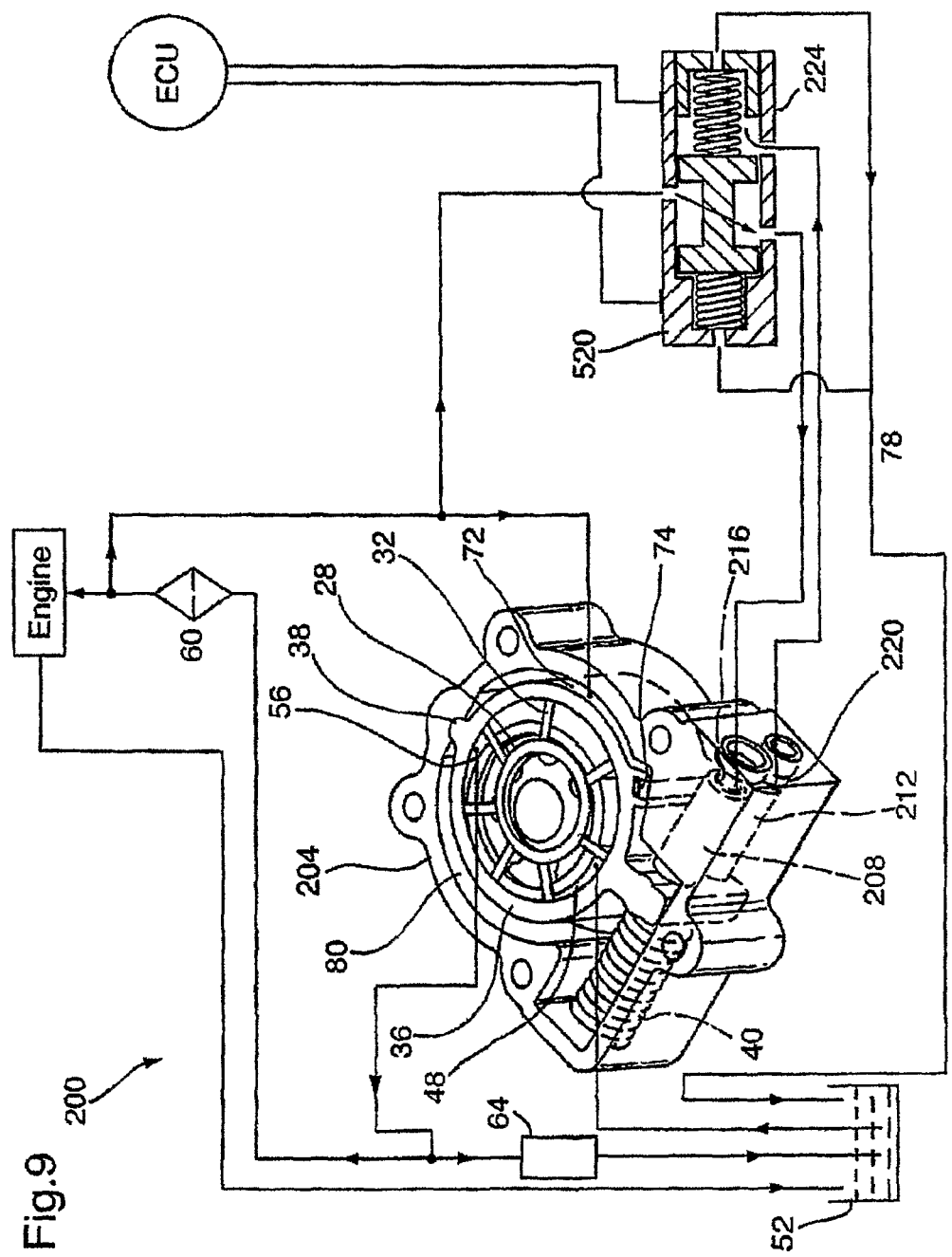
FIG. 9 shows a hydraulic circuit of another embodiment of a variable displacement variable pressure vane pump system in accordance with the present invention with the pump system in a high displacement state.

Another embodiment of a lubrication pump system in accordance with the present invention is indicated generally at 200 in FIG. 9, wherein like components to those of system 20 are indicated with like reference numerals. In system 200, VDVP 204 includes a pair of control cylinders 208 and 212, preferably of different diameters and thus having different areas, each of which has a respective chamber 216 and 220 which can be connected to a supply of pressurized lubrication oil by a two port control valve 224 while control chamber 72 is in direct fluid communication with the pressurized lubrication oil pressurized by VDVP 204. In the illustrated embodiment, control piston 208 has a larger cross sectional area than control piston 212, thus producing a greater force for a given pressure of pressurized lubrication oil. This allows for a finer granularity of control of the output of VDVP 204.

Control valve 224 can be operated by the ECU, or any other suitable control means, to supply neither or either of chambers 216 and 220 with pressurized lubrication oil and/or to connect either or both chambers 216 and 220 to source 52, via return line 78. If neither of chambers 216 or 220 are supplied with pressurized lubrication oil, the force created by the pressurized lubrication oil in control chamber 72 is the only force acting on control slider 36 against the biasing force of biasing spring 44. If one of chambers 216 and 220 is supplied with pressurized lubrication oil, then the forced developed on the respective one of control cylinders 208 and 212 adds to the force developed by control chamber 72. As will now be apparent, system 200 allows the output characteristic of VDVP 204 to more closely match the requirements of the engine.

While the embodiment of FIG. 9 shows only one configuration for a VDVP system 200 with three selectable pressures and, as should now be apparent to those of skill in the art, different configurations and or/types of valve 224 can be employed to accommodate different VDVP output requirements.

Figure 10:
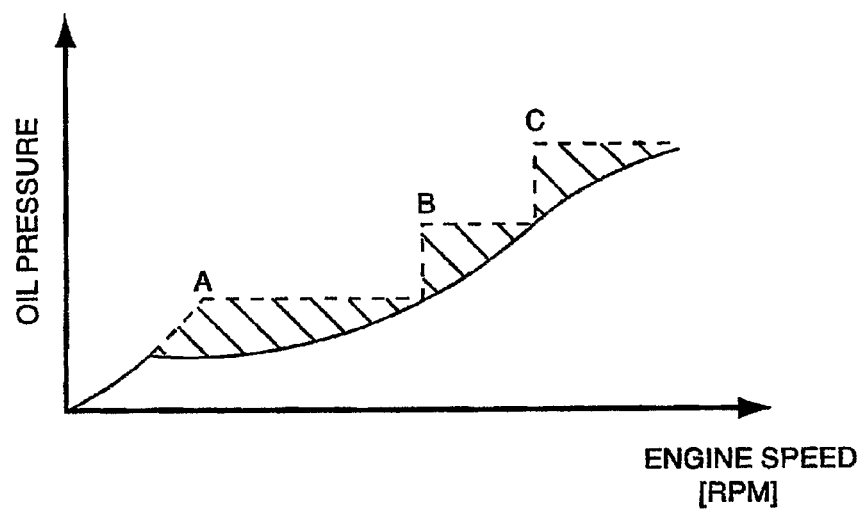
FIG. 10 shows a plot of oil pressure demand of a mechanical system versus the output of the pump system of FIG. 9.

FIG. 10 shows a plot, similar to that of FIG. 1, of the lubricating oil pressure requirement (shown in solid line) of a typical internal combustion engine versus the output (shown in dashed line) of system 200. When the engine is at low speeds, control valve 224 is opened so that the larger chamber 216 is supplied with pressurized lubrication oil and thus each of control chamber 72 and control cylinder 208 can apply force to control slider 36.

The transition point labeled "A" in the plot corresponds to the pressure of the lubrication oil output by VDVP 204 reaching the point wherein the sum of the resulting forces from control chamber 72 and control cylinder 208 is sufficient to begin moving control slider 36 against the biasing force of biasing spring 44.

The transition point labeled "B" in the plot corresponds to control valve 224 removing the supply of pressurized lubrication oil from chamber 216 and adding the supply of oil to control chamber 220 thus control chamber 72 and control cylinder 212 then apply force to control slider 36.

The transition point labeled "C" in the plot corresponds to control valve 224 also removing the supply of pressurized lubrication oil from chamber 220 and thus only control chamber 72 then applies force to control slider 36.

As is apparent, the shaded area between the engine demand curve and the output curve of system 200, wherein energy is lost as the output of system 200 exceeds engine demand, is much smaller than the comparable regions of FIGS. 1 and 6.

Figure 11:
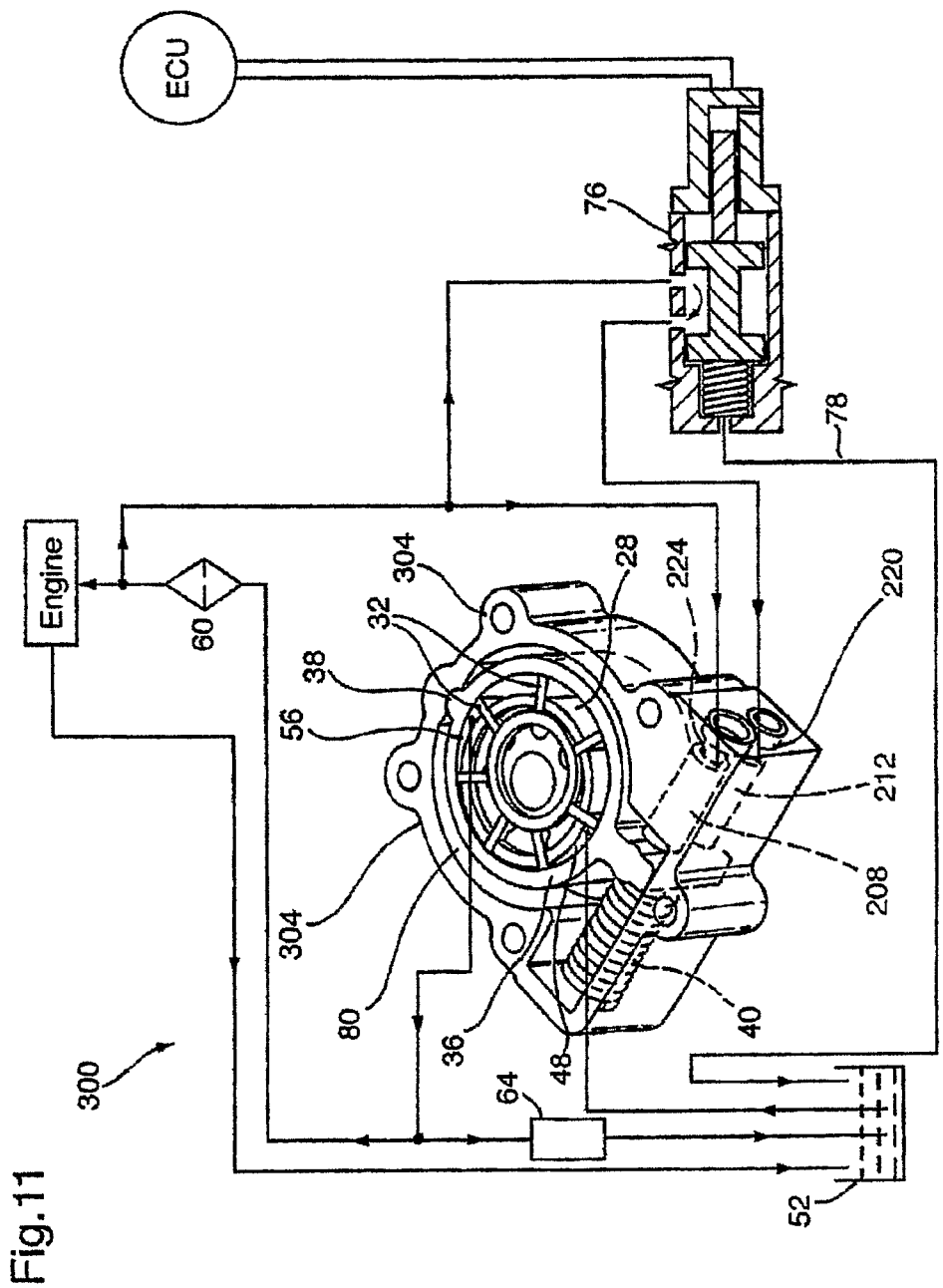
FIG. 11 shows a hydraulic circuit of another embodiment of a variable displacement variable pressure vane pump system in accordance with the present invention with the pump system in a lower speed, high displacement and lower pressure state.

Another embodiment of a lubrication pump system in accordance with the present invention is indicated generally at 300 in FIG. 11 wherein like components to those of system 20 and/or system 200 are indicated with like reference numerals. In system 300, VDVP 304 is not equipped with a control chamber 72 and, instead, volume 304 is maintained at substantially atmospheric pressure, similar to volume 80 as there is no slide seal in this embodiment. However, chamber 224 is connected directly to a supply of pressurized lubrication oil and, along with control cylinder 208, provides force to control slider 36 in the manner of control cylinder 44 of FIGS. 2 through 5 or in the manner of control chamber 72 of FIG. 7. Chamber 220 is connected to control valve 76 and, when connected by control valve 76 to a source of pressurized lubricating oil, applies force to control slider 36 via control cylinder 212.

Figure 12:
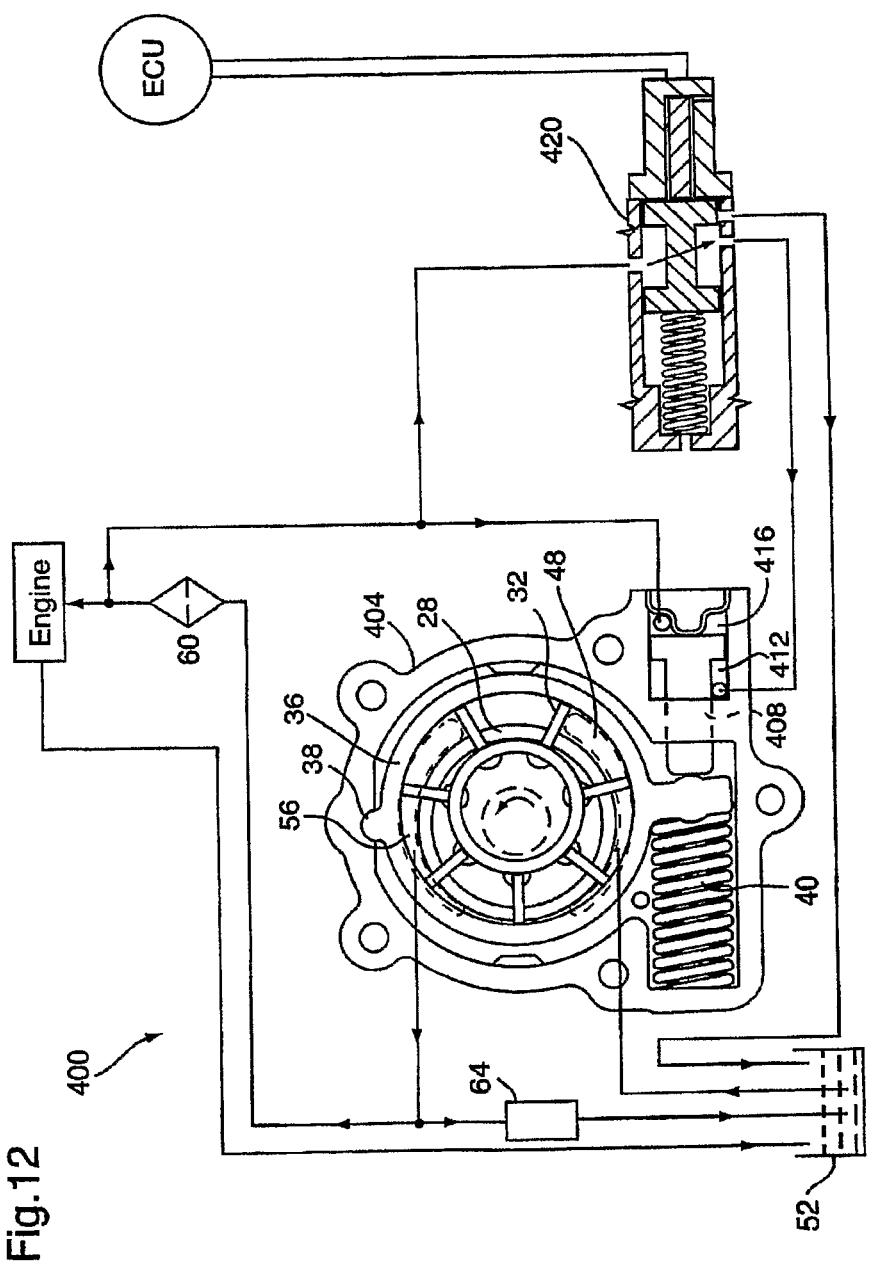
FIG. 12 shows a hydraulic circuit of another embodiment of a variable displacement variable pressure vane pump system in accordance with the present invention with the pump system in a high displacement state.

Another embodiment of a lubrication pump system in accordance with the present invention is indicated generally at 400 in FIG. 12, wherein like components to those of system 20 are indicated with like reference numerals. In system 400, VDVP 404 includes a double acting control cylinder 408 and a first control chamber 412 and a second control chamber 416. Second control chamber 412 has a smaller projected area on control cylinder 408 than does control chamber 416.

Control chamber 416 is connected directly to a supply of pressurized lubrication oil while control chamber 412 can be connected to the same supply of pressurized lubrication oil via control valve 420. As shown in the Figure, control valve 420 is operable to either connect control chamber 412 to the above-mentioned supply of pressurized lubrication oil or to connect chamber 412 to source 52, to allow pressurized lubrication oil to leave control chamber 412 and return to source 52.

As will now be apparent, pressurized lubrication oil in control chamber 416 generates a force on control cylinder 408 which acts against biasing spring 40 to move control slide 36 to decrease the displacement of VDVP 404. However, when control valve 420 allows pressurized lubrication oil to enter control chamber 412, the force developed on control cylinder 408 in control chamber 412 adds to the force of biasing spring 40 to oppose the force generated in control chamber 416 on control cylinder 408. By appropriately operating control valve 420, the output of VDVP 404 can be more closely matched to the requirements of the engine.

Figure 13:
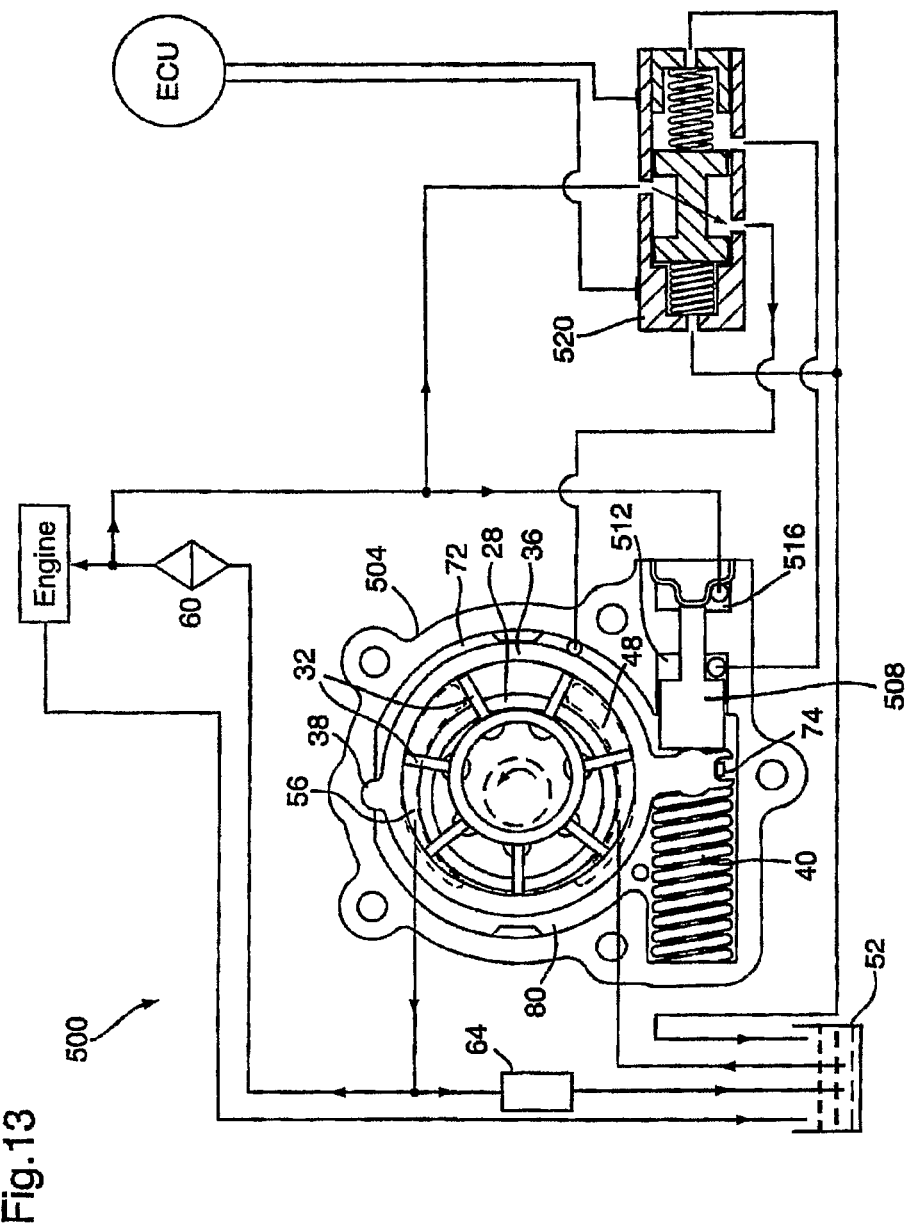
FIG. 13 shows a hydraulic circuit of another embodiment of a variable displacement variable pressure vane pump system in accordance with the present invention with the pump system in a high displacement state.

Another embodiment of a lubrication pump system in accordance with the present invention is indicated generally at 500 in FIG. 13, wherein like components to those of system 20 are indicated with like reference numerals. In system 500, VDVP 504 includes a control cylinder 508 and a first control chamber 512 and a second control chamber 516. Second control chamber 516 is directly connected to a supply of pressurized lubrication oil while control chamber 72 and first control chamber 512 can selectively be connected to the supply of pressurized lubrication oil or to a return line to source 52 via control valve 520. As illustrated, and unlike the embodiment of FIG. 12 discussed above, the forces produced in first control chamber 512 and second control chamber 516 both act on control cylinder 508 to counter the force of biasing spring 40 on control slide 36 as does the force on control slide 36 produced in chamber 72.

As will now be apparent, the output of system 500 can be adjusted between three states, allowing control of the output of system 500 with relatively fine granularity. Specifically, the three states are achieved by pressurizing: second control chamber 516; second control chamber 516 and chamber 72 (by moving control valve 520 to connect chamber 72 to the supply of pressurized lubricating oil); second control chamber 516 and first control chamber 512 (by moving control valve 520 to connect first control chamber 512 to the supply of pressurized lubricating oil). As the projected area of chamber 72 differs from the area of first control chamber 512, and in the illustrated embodiment the projected area of chamber 72 is larger than the area of first control chamber 512, the above described embodiment provides three stages of output for system 500.

Further, in case of a failure of the control signals from the ECU, or control valve 520 itself, assumes a centered position wherein chamber 72 and first control chamber 512 are connected to source 52 by their respective return lines, ensuring that system 500 assumes its maximum displacement operating state as a failsafe configuration. As will be apparent to those of skill in the art, similar failsafe configurations can be provided for the other embodiments described above.

The present invention provides a variable displacement variable pressure vane pump system for providing lubrication oil to internal combustion engines. The system includes at least a first control mechanism, which can be a control chamber directly acting on the control slider or a control chamber and control cylinder which acts on the control slider and a second control mechanism which is a control chamber and control cylinder which acts on the control slider. A control valve, operated by the engine control unit or other suitable control mechanism, can selectively apply or remove pressurized lubrication oil to the second control mechanism to allow the output of the pump system to more closely match the requirements of the engine. In one embodiment, the control mechanism merely applies or removes pressurized lubrication oil and in another embodiment, the control mechanism can control the pressure of the pressurized lubrication oil provided to the second control mechanism. In another embodiment a third control mechanism, which is a control chamber and control cylinder which acts on the control slider, is provided to provide finer granularity in controlling the output of the pump system to more closely correspond to the lubrication requirements of the engine. In yet another embodiment, both the first and second control mechanisms are control chambers and control cylinders which act on the control slider.

While the embodiments illustrated above show scenarios wherein the ECU, or other means, is providing a simple control signal that has two or three conditions related to engine speed, it will be apparent to those of skill in the art, that the control signal provided can be related to other parameters such as: temperature; the use of piston cooling jets; or a combination of parameters programmed into the ECU or other control processor or device. In all those scenarios, the principle of varying the pump capacity as well as pump pressure output is the same as that described herein.

The above-described embodiments of the invention are intended to be examples of the present invention and alterations and modifications may be effected thereto, by those of skill in the art, without departing from the scope of the invention which is defined solely by the claims appended hereto.

We claim:

1. A variable displacement variable pressure vane pump system for providing lubrication oil to a mechanical system comprises:
   a variable displacement variable pressure vane pump having a control slider which is moveable to alter the displacement of the pump;
   a biasing means to bias the control slider towards a position corresponding to the maximum displacement position of the pump;
   a first control mechanism responsive to the pressure of the lubrication oil output from the pump to apply a force to the control slider to counter a biasing force of the biasing means and to urge the control slider away from the position corresponding to the maximum displacement position of the pump;
   a second control mechanism responsive to the pressure of the lubrication oil output from the pump to apply a force to the control slider to alter the displacement of the pump;
   a control means operable to vary the lubrication oil supplied to the second control mechanism to alter the output of the pump to closely correspond to the lubrication requirements of the mechanical system; and
   a third control mechanism responsive to the pressure of the lubrication oil output from the pump to apply a force to the control slider to counter the biasing force of the biasing means and to urge the control slider away from the position corresponding to the maximum displacement position of the pump and wherein the control means is operable to vary lubrication oil output from either or both of the second control mechanism and the third control mechanism to alter the output of the pump to closely correspond to the lubrication requirements of the mechanical system.

2. The variable displacement variable pressure pump system of claim 1 wherein the first control mechanism comprises a control chamber formed between the exterior of the control slider, a control slider seal, a control slider pivot point and the interior surface of a housing of the pump, the pressurized lubricating oil provided to the control chamber directly producing the force on the control slider.

3. The variable displacement variable pressure pump system of claim 2 wherein the control means comprises a solenoid valve.

4. The variable displacement variable pressure pump system of claim 3 wherein the solenoid valve is electrically controlled by an engine control unit.

5. The variable displacement variable pressure pump system of claim 3 wherein the solenoid valve is operable to alter the pressure of the pressurized lubrication oil provided to the second control mechanism.

6. The variable displacement variable pressure pump system of claim 1 wherein the first and second control mechanisms each comprise chambers being isolated from each other when the control means ceases the supply of lubrication oil to the second control mechanism.

7. The variable displacement variable pressure pump system of claim 1 wherein the mechanical system is an internal combustion engine.

8. The variable displacement variable pressure pump system of claim 1 wherein the mechanical system is an automatic transmission.

9. The variable displacement variable pressure pump system of claim 1 wherein the pressurized lubrication oil is supplied to the first and second control mechanisms from an outlet of the pump.

10. The variable displacement variable pressure pump system of claim 1 wherein the pressurized lubrication oil is supplied to the first and second control means from a lubrication oil gallery of the mechanical system.

11. A variable displacement variable pressure vane pump system for providing lubrication oil to a mechanical system comprises:
    a variable displacement variable pressure vane pump having a control slider which is moveable to alter the displacement of the pump;
    a biasing means to bias the control slider towards a position corresponding to the maximum displacement position of the pump;
    a first control mechanism responsive to the pressure of the lubrication oil output from the pump to apply a force to the control slider to counter a biasing force of the biasing means and to urge the control slider away from the position corresponding to the maximum displacement position of the pump;
    a second control mechanism responsive to the pressure of the lubrication oil output from the pump to apply a force to the control slider to alter the displacement of the pump; and
    a control means operable to vary the lubrication oil supplied to the second control mechanism to alter the output of the pump to closely correspond to the lubrication requirements of the mechanical system, further comprising a third control mechanism responsive to the pressure of the lubrication oil output from the pump to apply a force to the control slider to counter the biasing force of the biasing means and to urge the control slider away from the position corresponding to the maximum displacement position of the pump and wherein the control means is further operable to vary the supply of lubrication oil between the second control mechanism and the third control mechanism to alter the output of the pump to closely correspond to the lubrication requirements of the mechanical system and wherein the second control mechanism and the third control mechanism create different magnitudes of force for a given pressure of lubrication oil.

12. The variable displacement variable pressure pump system of claim 11, wherein the first control mechanism comprises a control chamber formed between the exterior of the control slider, a control slider seal, a control slider pivot point and the interior surface of a housing of the pump, the pressurized lubricating oil provided to the control chamber directly producing the force on the control slider.

13. The variable displacement variable pressure pump system of claim 12, wherein the pressurized lubrication oil is supplied to the first and second control mechanisms from an outlet of the pump.

14. The variable displacement variable pressure pump of claim 13, wherein the second and third control mechanisms include pistons rigidly connected to one another.

* * * * *